United States Patent [19]

Heilmayr

[11] 4,015,925

[45] Apr. 5, 1977

[54] EXTRUSION EQUIPMENT AND ESPECIALLY DIE STRUCTURE FOR MAKING PLASTIC SIDING

[75] Inventor: Peter F. Heilmayr, McPherson, Kans.

[73] Assignee: Certain-teed Products Corporation, Valley Forge, Pa.

[22] Filed: Oct. 17, 1973

[21] Appl. No.: 407,314

Related U.S. Application Data

[63] Continuation of Ser. No. 225,348, Feb. 10, 1972, abandoned, which is a continuation of Ser. No. 2,900, Jan. 14, 1970, abandoned.

[52] U.S. Cl. .............................. 425/461; 425/376 R
[51] Int. Cl.² ........................................... B29F 3/04
[58] Field of Search ........ 264/176 F, 176 R, 177 F, 264/177 R, 211; 425/143, 144, 461, 463, 466, 376, 378, 379

[56] References Cited

UNITED STATES PATENTS

| | | | |
|---|---|---|---|
| 2,332,829 | 10/1943 | Parsons et al. | 425/378 UX |
| 3,320,634 | 5/1967 | Ryan et al. | 425/466 X |
| 3,394,924 | 7/1968 | Harder | 425/DIG. 49 |
| 3,608,145 | 9/1971 | Baker et al. | 425/326 |
| 3,649,147 | 3/1972 | Fritsch | 425/461 X |

*Primary Examiner*—Francis S. Husar
*Assistant Examiner*—Mark Rosenbaum
*Attorney, Agent, or Firm*—Synnestvedt & Lechner

[57] ABSTRACT

Extrusion equipment is disclosed, including an extrusion die structure having a die passage formed to provide improved flow conditions and control including equalization of the flow of the plasticated resin material in a zone close to the lip portion of the die.

3 Claims, 18 Drawing Figures

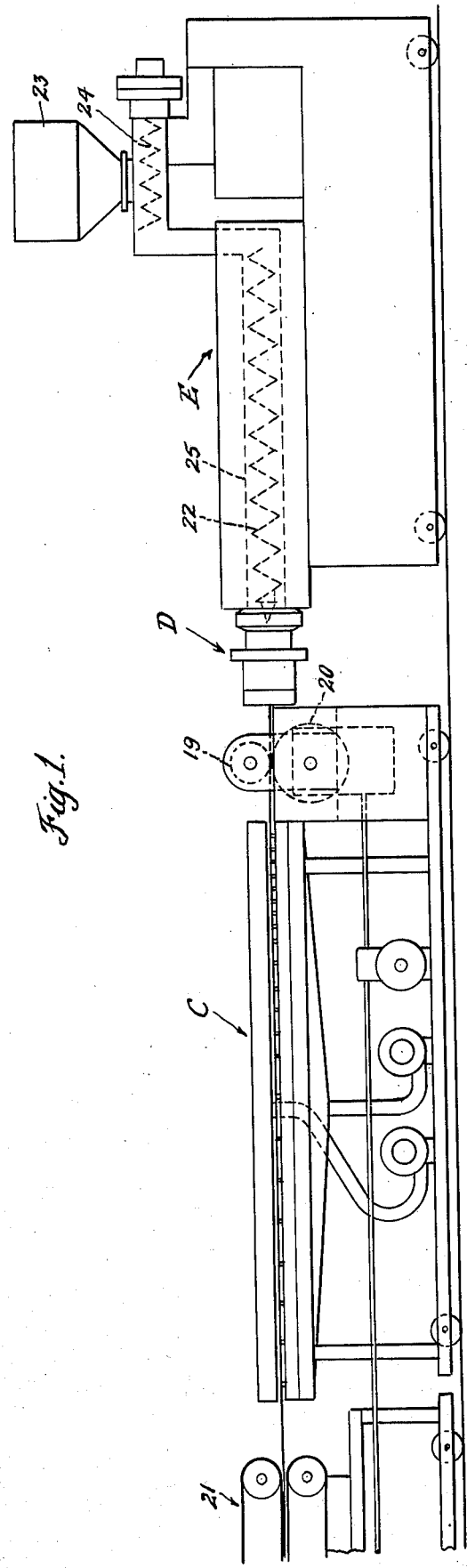
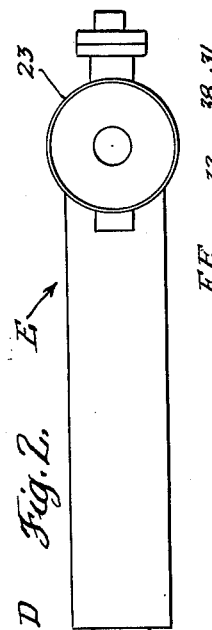
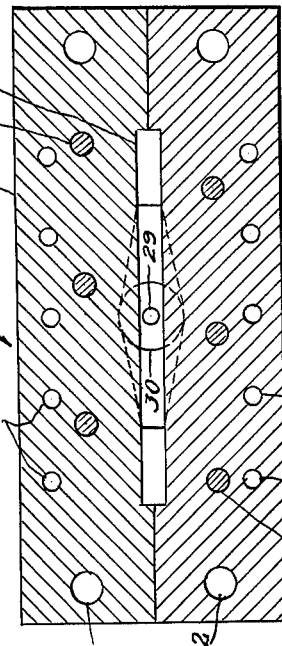
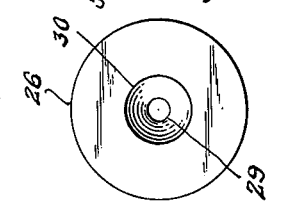
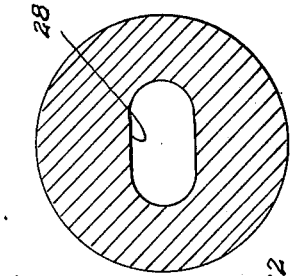
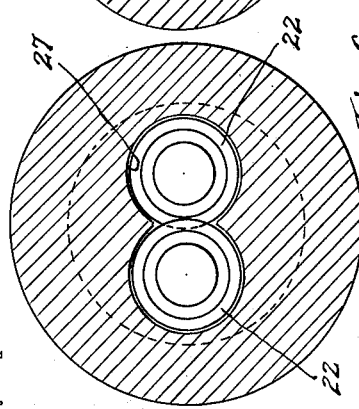

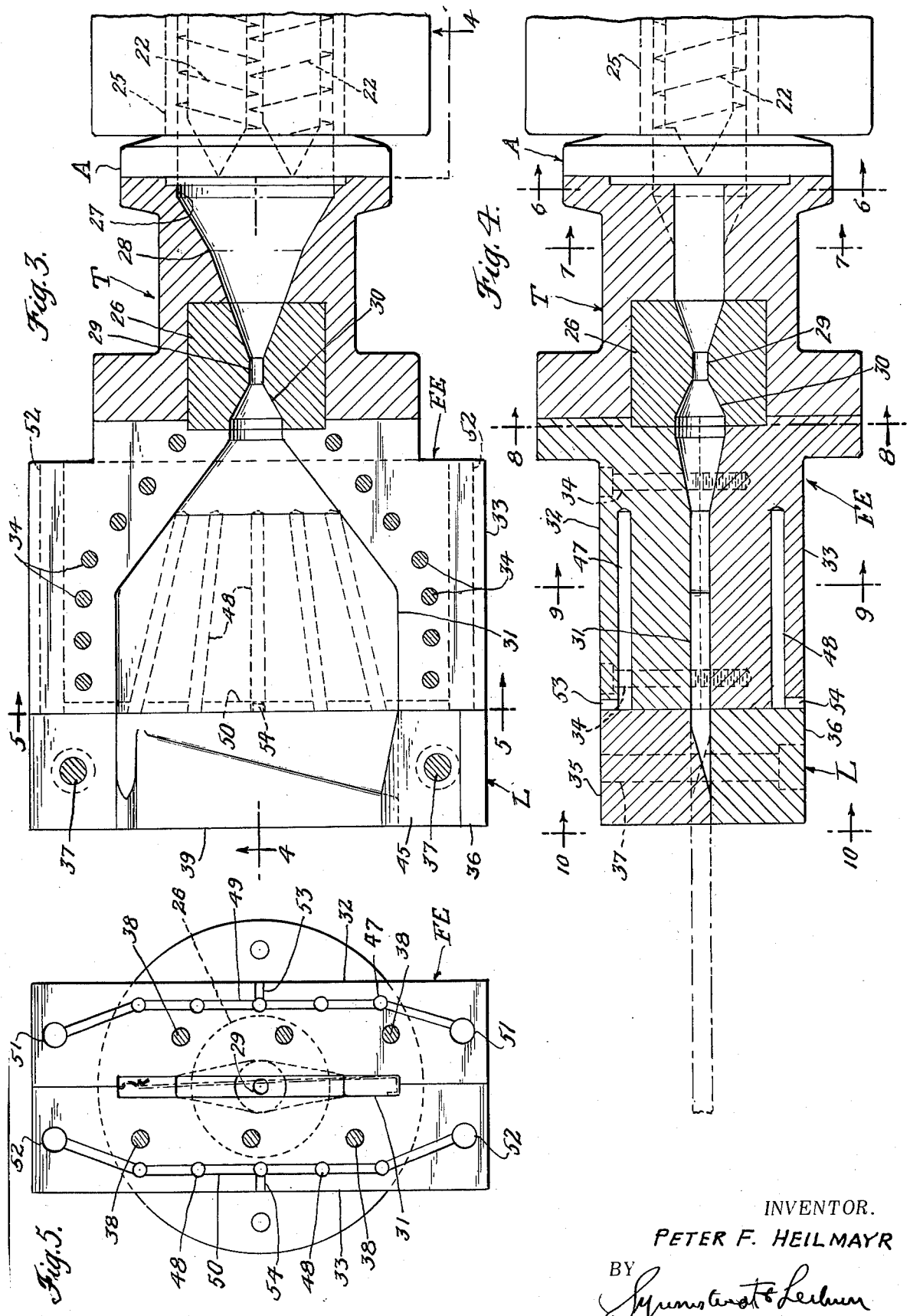

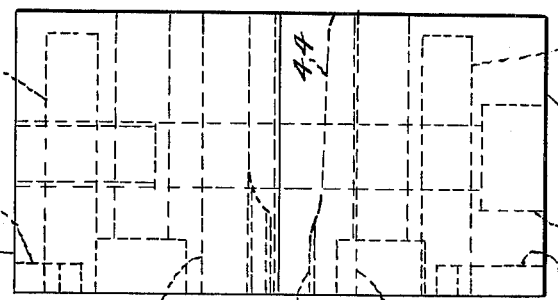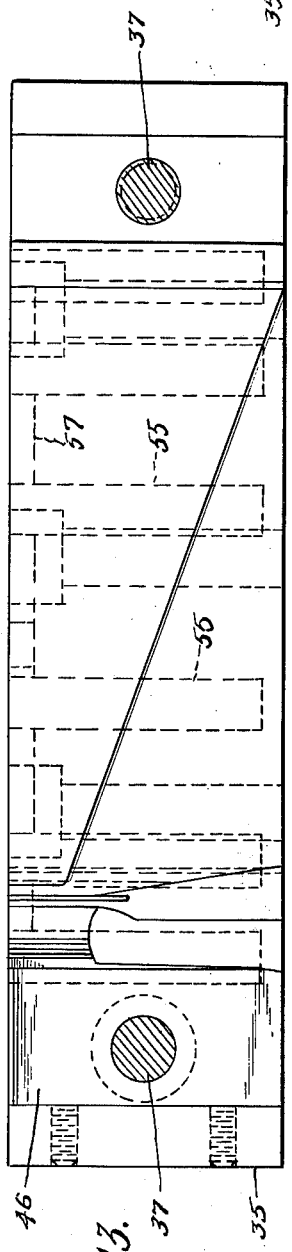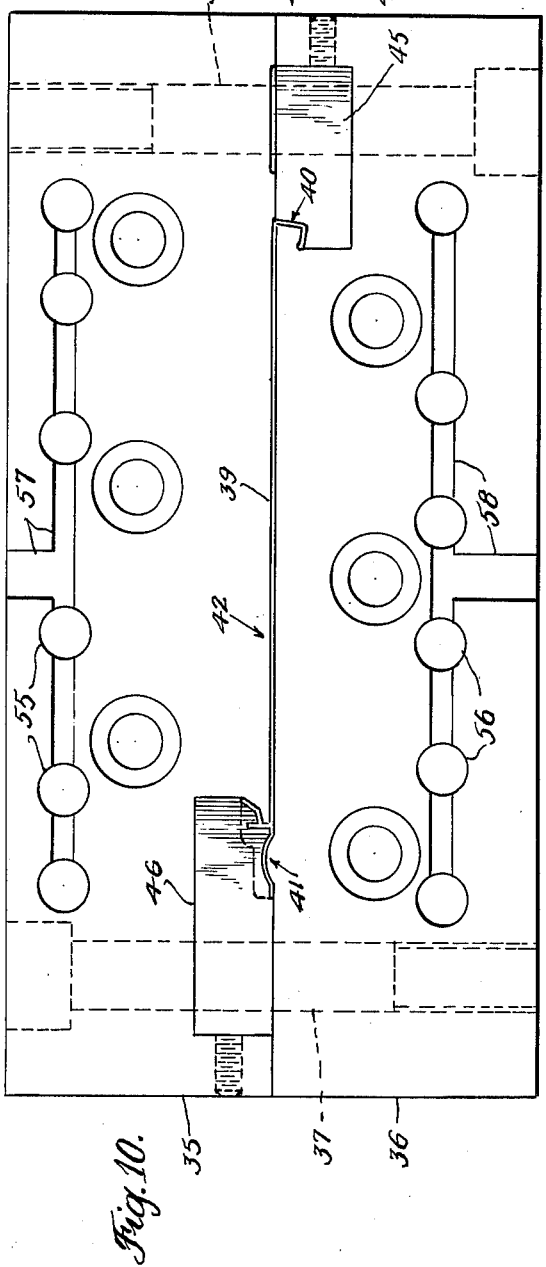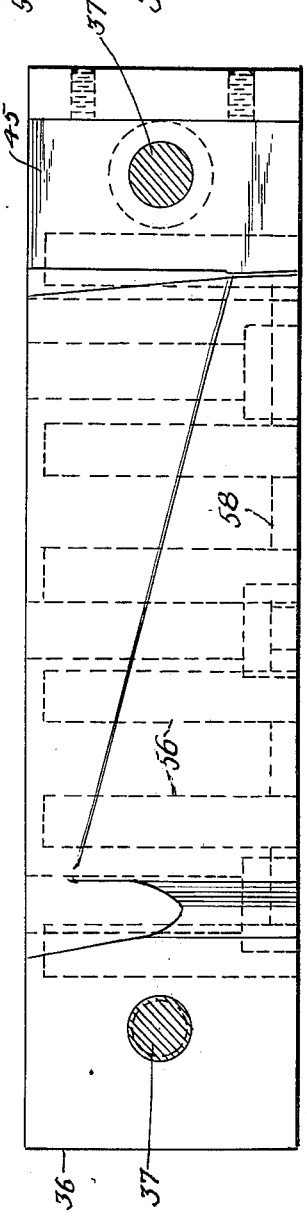

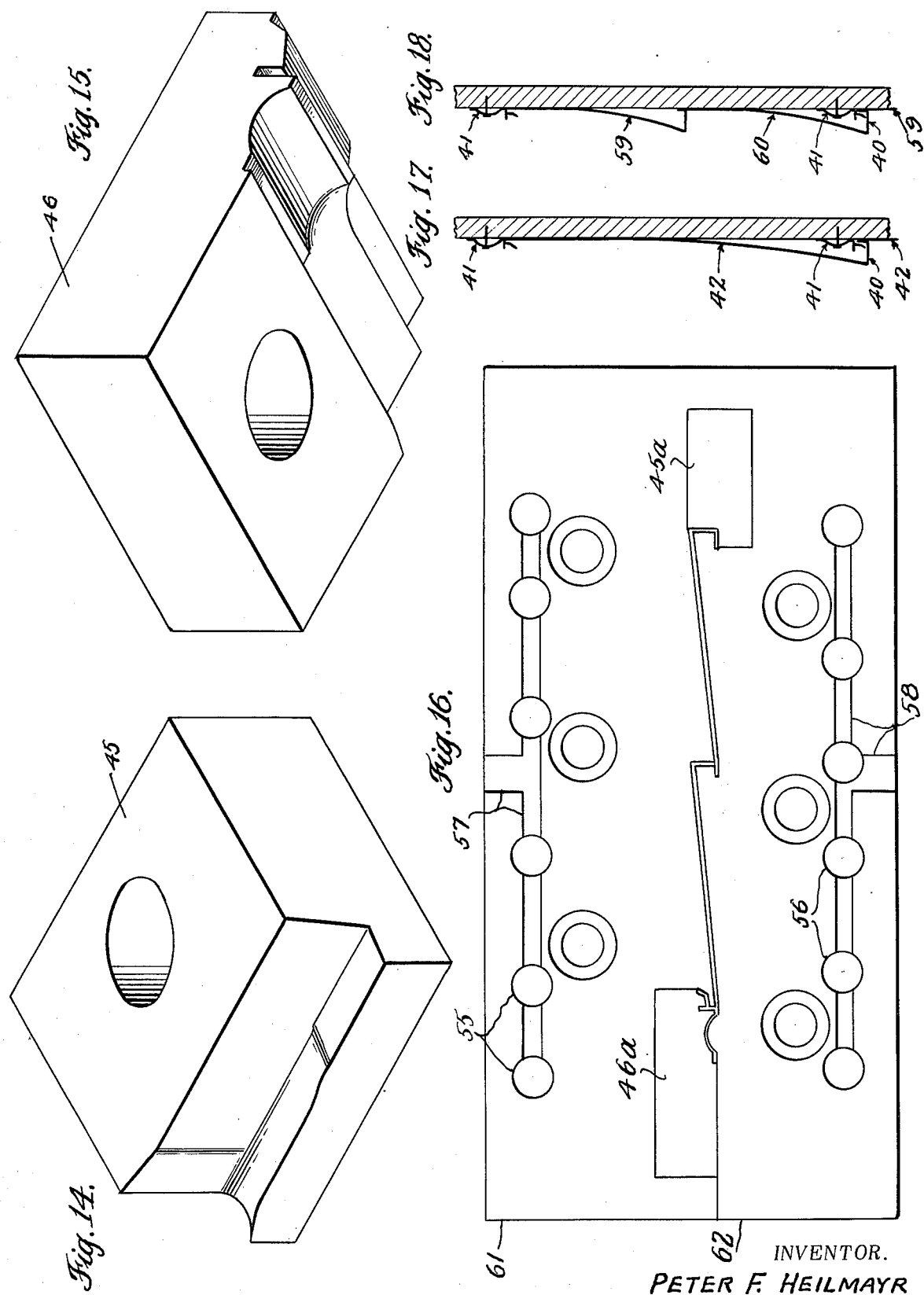

EXTRUDER

Although from the standpoint of a number of features of the present invention, the extruder may comprise any of a variety of known types of extrusion equipment, it is preferred and contemplated according to the present invention that the extruder be of the multiple screw type. The free ends of a pair of screws of such an extruder are indicated at 22—22 in FIG. 3. The extruder is adapted to be fed with the resin material in powder form, by delivery of such resin material into the hopper indicated at 23, from which it is delivered by the feed screw 24 into the barrel 23 surrounding the twin screws 22—22. Provision is made for careful regulation of the temperature of the extruder, for which purpose the extruder is advantageously divided into several temperature control zones, as is known with equipment of this type.

EXTRUSION DIE STRUCTURE

In general, the structure of the die is sectionalized and includes four sections indicated generally by letters in FIGS. 3 and 4.

Section A is an adaptor section having a die passage with an inlet of cross section conforming with the discharge end of the barrel of the twin screw extruder, and having a discharge of cross section conforming with the inlet end of the die passage in the transition section, which latter is indicated at T.

The transition section also includes an insert 26 having a restricted flow passage therein serving to increase, the rate of flow of the resin and to thereby aid in homogenizing the resin material, this being of especial advantage and importance where the resin composition incorporates a plurality of constituents, as is ordinarily preferred.

The next section of the die structure which is indicated by the letters FE is a section in which the cross sectional shape of the die passage is altered from a generally circular shape to a flattened and wide shape, which latter shape is maintained throughout an appreciable distance, for instance from about 1 to 6 inches in the case of equipment adapted to produce an 8 inch siding. This portion of the flow passage in the section of the die structure identified by the letters FE serves to equalize the flow of the resin material in a region adjacent to the lip parts of the die, and thus near to the discharge orifice of the lip section L of the die structure.

In considering the shape of the die parts and of the die passages in greater detail, reference should be made not only to FIGS. 3 and 4, but also to FIGS. 5 to 15, especially in the light of the following description.

As seen in FIG. 6, the flow passage 27 at the entrance end of the transition section T has side by side interconnected substantially circular parts representing in effect a projection of the shape of the passage in the delivery end of the twin screw extruder. In general, this shape is also present in the adapter section A.

Proceeding downstream from the section shown in FIG. 6, it will be seen from FIG. 7 that the cross sectional shape 28 of the passage has assumed an almost oval configuration. The passage then changes to a circular cross section and is thereafter greatly reduced in cross section at the neck or restriction 29 which is formed in the block 26, as will readily be seen from FIG. 8. FIG. 8 also shows at 30 the cross sectional shape at the plane of junction of the block 26 of the transition section T and the flow equalizing section FE. By providing the restruction 29 in the block 26, provision is made for convenient substitution of blocks and thus for change in the restriction which is desirable when the resin composition is varied.

As will be seen from the section of FIG. 9, the shape of the passage flattens and widens as indicated at 31. This cross sectional configuration is maintained throughout a substantial distance, for instance from 1 to 6 inches as mentioned above, for the purposes already stated. The width of the passage 31 is here approximately the same as the overall width of the siding being produced and the thickness is desirably about 15 to 25 times the thickness of the product.

It will be observed that the flow equalizing section FE of the die structure is split in the plane of the passage 31, the upper and lower parts 32 and 33 being secured together by bolts indicated at 34.

The final section of the die structure comprises the die lips L and here again the structure is split generally in the plane of the siding being formed, the upper and lower parts being indicated at 35 and 36. The two parts of the lips are interconnected by means of bolts 37, and the die lip assembly is connected with the downstream end of the section FE by means of bolts such as indicated at 38.

The die lip section serves to define the discharge or extrusion orifice which is indicated at 39 and from FIG. 10 it will be seen that this orifice is in general in the shape of an 8 inch siding such as shown in FIG. 17, having a butt edge 40, a hanger edge 41 and an intervening panel 42. As shown in FIG. 10 the orifice for forming the intervening panel is flat, whereas the panel 42 indicated in FIG. 17 has some curvature. This curvature is preferably imparted subsequent to the extrusion from the discharge orifice of the die.

It should also be understood that the discharge orifice will not necessarily exactly correspond in size and shape to the siding to be made. Indeed, in order to compensate for swelling and shrinkage factors which are present in all extrusion operations, it is preferred to utilize dimensions in the discharge orifice which are somewhat different from corresponding dimensions of the siding being made. For example, the width of the die passage is desirably increased about 5 to 15% as compared with the width of the siding, and the thickness of the passage is desirably reduced by approximately 50%, as compared with the thickness of the siding being produced.

The cross sectional shape 39 of the discharge orifice is preferably maintained for some distance into the lips of the die upstream of the discharge face of the die, for instance for a distance equal to from about 10 to about 30 times the thickness of the extruded siding. Proceeding upstream from this terminal portion of uniform cross sectional shape, the passage in the lip section L progressively changes and becomes increasingly thicker until the upstream face of the lip parts is reached, at which point the cross sectional shape in the lip section coincides with the cross sectional shape of the flow equalizing passage in the downstream end portion of the flow equalizing section FE of the structure. The portion of the die passage in the lips which is of uniform cross sectional shape is indicated in FIG. 11 at 43, and the transition portion upstream of the portion 43 is indicated at 44 in FIG. 11.

The die lip surfaces which are configured to form portions of the butt and hanger edges are desirably

EXTRUSION EQUIPMENT AND ESPECIALLY DIE STRUCTURE FOR MAKING PLASTIC SIDING

This is a continuation of application Ser. No. 225,348, filed Feb. 10, 1972, now abandoned, which in turn is a continuation of application Ser. No. 2900 filed Jan. 14, 1970, now abandoned.

BACKGROUND AND STATEMENT OF OBJECTS

It is known to produce siding from thermoplastic resin materials and for this purpose extrusion techniques have been employed in accordance with which the resin material in plasticated form is extruded through a die orifice generally conforming with the cross sectional shape of the siding, after which the extruded siding is cooled to harden it. Thereafter appropriate lengths are cut from the hardened extrusion and various machining operations are applied. In operations of the kind above referred to, it is also known to utilize polyvinyl chloride resin materials, usually formulated with pigment and other constituents to impart special properties to the product.

The present invention is especially concerned with an extrusion die structure arranged to provide for equalization and increase in uniformity of flow of the plasticated resin in a region upstream of but close to the die lips, thereby minimizing tendency for the extruded siding to distort after leaving the discharge orifice of the die.

The invention also contemplates a special die structure arranged to facilitate accuracy of heating and of control of the die temperature in various localized zones, to thereby further enhance the uniformity of the extrusion.

Still further it is an object of the present invention to provide a die structure in which the plasticized material is homogenized by passage through a die passage restriction in advance of the region in which the flow is equalized, thereby providing for increase in uniformity of admixture of the various constituents of which the resin mix is made up.

The invention also has in view the provision of a die structure which will facilitate changeover from one extruded shape to another, this being accomplished without requiring complete substitution of the die, but substitution of only a portion thereof.

How the foregoing and other objects and advantages are attained will appear more fully from the following description referring to the accompanying drawings.

BRIEF DESCRIPTION OF DRAWINGS

FIG. 1 is a somewhat diagrammatic elevational view of a portion of a siding production line of the type in which the die structure of the present invention is adapted to be used;

FIG. 2 is a plan view of certain parts and of the siding being produced in accordance with the production line of FIG. 1;

FIG. 3 is an enlarged horizontal sectional view through a die structure according to the present invention, this view indicating the die structure as being associated with the delivery end of a twin screw extruder;

FIG. 4 is a vertical sectional view of the structure shown in FIG. 3, taken as indicated by the section line 4—4 on FIG. 3;

FIG. 5 is a view taken in the plane indicated by the lines 5—5 in FIG. 3, and showing an intermediate portion of the die structure in elevation;

FIGS. 5, 6, 8 and 9 are transverse views taken respectively as indicated by the lines 6—6, 7—7, 8—8 and 9—9 on FIG. 4;

FIG. 10 is a discharge end view of the die structure shown in FIGS. 3 and 4, this view being taken as indicated by the section line 10—10 on FIG. 4 but being on an enlarged scale, and further showing the cross sectional shape of the discharge orifice which is here adapted to the extrusion of an 8 inches siding piece;

FIG. 11 is a view taken from the right hand end of the structure shown in FIG. 10 and illustrating only the lip portions of the die, with certain interior contours indicated in dotted lines;

FIG. 12 is a top plan view of the lower die lip shown in FIGS. 10 and 11;

FIG. 13 is a bottom plan view of the upper die lip shown in FIGS. 10 and 11;

FIGS. 14 and 15 are further enlarged isometric views illustrating certain die lip inserts employed in the structure shown in FIGS. 3 to 13;

FIG. 16 is a discharge end view of die lips which may alternatively be employed with the remainder of the die structure shown in FIGS. 3 to 9, the die lips of FIG. 16 being adapted to extrude a multiple siding piece, such as a double 4 inch siding piece;

FIG. 17 is a transverse vertical sectional view through an 8 inch siding piece of the kind produced by the equipment shown in FIGS. 1 to 15 inclusive; and FIG. 18 is a view similar to FIG. 17 but illustrating the cross sectional shape of a double 4 inch siding piece as produced in accordance with the equipment shown in FIG. 16.

GENERAL ARRANGEMENT

The general arrangement of the equipment is illustrated in FIGS. 1 and 2 and in FIG. 1 three general sections or stations are indicated, as follows.

First, an extruder mechanism indicated at E is shown at the right hand end of the production line. This extruder is adapted to receive powder polyvinyl chloride resin composition and to heat and plasticate the resin material and then deliver it into and through an extrusion die structure which is indicated at D, of special form according to the present invention as hereinafter fully described.

The extrusion die (which is shown in greater detail in FIGS. 3 to 16) is formed with various passages to be described, including an inlet passage for receiving the plasticated resin from the extruder, and a discharge orifice of cross sectional shape generally conforming with the cross section of the siding being made.

After delivery of the siding from the discharge orifice of the die the siding in soft or plasticated condition is passed through the nip formed between a pair of rolls 19 and 20, one of which (19) is etched so as to emboss the siding and thereby impart a grain texture to the face side of the siding. After leaving the embosser, the siding passes into and through the equipment generally indicated at C which is provided for cooling and sizing the siding, thereby hardening the siding in the desired cross sectional shape and form. The siding is advanced through this cooling and sizing equipment by means of the puller mechanism indicated at 21.

provided on die insert blocks such as indicated at 45 and 46, these inserts or blocks being illustrated in the enlarged isometric views of FIGS. 14 and 15. These blocks are of the same dimension axially of the flow as are the main lip parts 35 and 36. The fabrication or shaping of the die surfaces is greatly facilitated by forming some of the surfaces on separate inserts or blocks and, in addition, this type of construction provides for variation of the specific contour of the butt and hanger edges of the extruded siding merely by substitution of different insert blocks without requiring the fabrication of additional primary lip elements such as those indicated at 35 and 36.

The die structure is desirably provided with temperature control devices. Thus, in the flow equalizing section FE of the die structure bores or cavities 47 and 48 are arranged in a series in the upper and lower die parts 32 and 33, as is clearly illustrated in FIGS. 3, 4 and 5. From the illustration in FIG. 3 it will be noted that these bores are arranged fanwise and are extended throughout most of the flow length of the die passage in the flow equalizing section of the die. At their downstream ends, the bores 48 communicate with transverse passages 49 and 50 which are formed in the downstream end of the die parts 32 and 33. The channels 49 and 50 may be employed for wiring electrical heater elements inserted in the bores 47 and 48. The outer ends of the channels 49 and 50 communicate with bores 51 and 52 which may also be used for insertion of electrical heater elements. Ports 53 and 54 communicating with the channels 49 and 50 are provided for wiring purposes.

Cavities or bores are also provided in the die lips 35 and 36 in order to accommodate temperature regulating elements, such as electrical heating devices. As seen in FIG. 10, the die lips are provided with cavities 55 and 56 interconnected with wiring channels 57 and 58.

Various of the heater elements in the cavities provided in both the flow equalizing section and also in the die lip section of the die structure are adapted to be interconnected and controlled individually or in groups providing a certain temperature gradient in various regions of the die structure. It will be understood that not only the flow equalizing section FE and the die lip section L are provided with such controllable elements, but in addition controllable heaters are also desirably associated with the transition section T of the die structure, for instance by one or more electrical heater elements wrapped around the transition section.

In the wiring and control of the various electrical heating elements, it is contemplated according to the present invention that the flow equalizing section FE be maintained at a temperature somewhat higher than that of the transition section T. For instance when employing a resin composition composed primarily of polyvinyl chloride resin of inherent viscosity value of between 0.90 and 1.10, the temperature of the flow equalizing section is desirably maintained between about 330° F. and 360° F., and the transition section maintained at a temperature between about 330° F. and 350° F.

With resin of the type just referred to and with temperatures such as those indicated for the flow equalizing section and the transition section, it is desirable to maintain certain related temperature values in various regions of the die lips. Moreover, in wiring and controlling the heater elements for the die lips, it is noted that the elements are desirably wired to provide four heating zones, one at the upper side of the die passage, one at the lower side of the die passage, and one at each end of the die passage near the butt and hanger edges of the siding being extruded. In general it is contemplated that the temperature at the upper side of the die passage in the die lips, which is the side corresponding to the face side of the siding being extruded, be maintained at a lower level than the temperature at the lower side of the die passage in the die lips. I have found that this temperature difference in the die lips aids in minimizing gloss or high light reflection on the face side of the siding being extruded. With use of a polyvinyl chloride resin composition of the kind above referred to, and with temperatures in the flow equalizing and transition sections of the die in the ranges referred to, the temperature in the die lip above the die passage is desirably maintained between about 340° F. and 360° F. and the temperature in the die lip below the die passage is desirably maintained between about 350° F. and 370° F. The temperature in the region of the edges of the extrusion is desirably maintained between about 360° F. and 380° F.

OPERATION OF THE SYSTEM AS A WHOLE

In considering the production of siding when using the die structure of the present invention it is first pointed out that although a variety of resin materials may be utilized, it is preferred to employ compositions of which the chief resin constituent is a polyvinyl chloride resin, most advantageous a polyvinyl chloride resin with an inherent viscosity value between 0.90 and 1.10.

The selected resin composition is introduced into the feed hopper 23 of the extruder and is heated and plasticated by the extruder, and ultimately delivered thereby through the die structure D and out of the die orifice while still in its initial plasticated condition. The initially flat panel, before any hardening or solidification of the resin in depth occurs, is fed into the nip between the embossing rolls 19 and 20, and the texture effect is therefore imparted to the resin prior to hardening in depth.

The siding then passes while still in its initial soft or plasticated condition into the sizing and cooling section C of the equipment, and in the equipment indicated at C the desired curvature is introduced in the panel of the siding, the entire siding including the butt and hanger edge portions are sized, and the resin material is cooled in order to harden it. Thereafter the hardened siding is carried away by the puller mechanism 21 and pieces of desired length are cut and otherwise processed if desired.

The use of the die structure of the present invention as fully described above facilitates the extrusion and formation of accurately dimensioned siding and serves also to ensure uniformity of the structure of the resin itself throughout the thickness of the siding in all parts thereof.

ALTERNATIVE EMBODIMENT

The major portion of the die structure above described may alternatively be employed for the production of the siding in a different form, for instance in the form of a siding having two interconnected 4 inch panel sections. This alternative form of siding is illustrated in FIG. 18. As with the first embodiment, the siding has a hanger edge 41 and a butt edge 40, but instead of a single intervening panel (as in FIG. 17) the double 4 inch siding has two interconnected 4 inch panel sections 59 and 60.

In making a siding of the kind shown in FIG. 18, the adapter section A, the transition section T and the flow equalizing section FE of the die structure may all conform with those described above, but in place of the lip section L shown in FIGS. 3 to 13, a lip section made up of parts 61 and 62 may be employed (see FIG. 16). As before, inserts such as indicated at 45a and 46a may be provided in the lip section in order to form the butt and hanger edges of the siding.

Cavities for heater elements and other devices and equipment such as those described above may also be associated with the lip parts shown in FIG. 16 in this alternative embodiment. In this way, merely by the substitution of different lip parts, siding of various different forms may be produced while still using the same flow equalizing and transition sections.

I claim:

1. A die structure for producing a siding of a thermoplastic material having a hanger edge portion, a panel portion, and a butt edge portion, said die structure comprising
   a. an adapter section having an entry passageway therein connecting to the discharge outlet of an extruder unit,
   b. a restriction section downstream of said adapter section having a restriction passage therein,
   c. a transition section between said adapter section and said restriction section having a transition passage connecting said entry passage and said restriction passage,
   d. a die lip section downstream of said restriction section having a lip orifice substantially conforming to the shape of the siding produced, the die lip section being maintained at the same cross-sectional shape for a distance in the flow channel upstream of the orifice equal to 10 to 30 times the thickness of the siding produced,
   e. and a flow equalization section between said restriction section and said die lip section having a flow equalization passage connecting said restriction passage and said lip orifice,
   f. all of said passages being interconnected in sequence and being unobstructed to thereby provide an uninterrupted flow channel from the discharge outlet of the extruder unit with which the entry passageway is connected to the die lip orifice, whereby the flow of the thermoplastic material throughout the length of said uninterrupted flow channel and out of the die lip orifice is adapted to be established and maintained by the action of the extruder unit with which the die structure is used.

2. A die structure for producing a siding of a thermoplastic material having a hanger edge portion, a panel portion, and a butt edge portion, said die structure comprising
   a. an adapter section having an entry passageway therein connecting to the discharge outlet of an extruder unit,
   b. a restriction section downstream of said adapter section having a restriction passage therein,
   c. a transition section between said adapter section and said restriction section having a transition passage connecting said entry passage and said restriction passage,
   d. a die lip section downstream of said restriction section having a lip orifice substantially conforming to the shape of the siding produced,
   e. and a flow equalization section between said restriction section and said die lip section having a flow equalization passage connecting said restriction passage and said lip orifice the flow equalization passage having a width substantially equal to the width of said die lip orifice and a thickness in the range of 15 to 25 times the thickness of the siding produced,
   f. all of said passages being interconnected in sequence and being unobstructed to thereby provide an uninterrupted flow channel from the discharge outlet of the extruder unit with which the entry passageway is connected to the die lip orifice, whereby the flow of the thermoplastic material throughout the length of said uninterrupted flow channel and out of the die lip orifice is adapted to be established and maintained by the action of the extruder unit with which the die structure is used.

3. The die structure defined in claim 2 wherein said flow equalization section further comprises
   i. a first set of heater elements positioned therein adjacent to the portion of said flow equalization passage formed to produce the surface of the inner or back side of said panel section of said siding,
   ii. and a second set of heater elements positioned therein adjacent to the portion of said flow equalization passage formed to produce the surface of the outer or face side of said panel section of said siding.

* * * * *

UNITED STATES PATENT AND TRADEMARK OFFICE
CERTIFICATE OF CORRECTION

PATENT NO. : 4,015,925
DATED : April 5, 1977
INVENTOR(S) : Peter F. Heilmayr

It is certified that error appears in the above—identified patent and that said Letters Patent are hereby corrected as shown below:

Column 1 -- Line 37 -- change "plasticized" to read --plasticated--.

Column2 -- Line 4 -- change "Figures 5, 6, 8 and 9" to read --Figures 6, 7, 8 and 9--.

Column 3 -- Line 13 -- change "barrel 23" to read --barrel 25--.

Signed and Sealed this ninth Day of August 1977

[SEAL]

Attest:

RUTH C. MASON
Attesting Officer

C. MARSHALL DANN
Commissioner of Patents and Trademarks